US008954005B2

(12) United States Patent
Zhao et al.

(10) Patent No.: US 8,954,005 B2
(45) Date of Patent: Feb. 10, 2015

(54) APPARATUS FOR LOW-FREQUENCY SIGNAL DETECTION AND TRANSMISSION

(75) Inventors: Hui Zhao, Guangdong (CN); Zhiyu Zheng, Guangdong (CN)

(73) Assignee: Nationz Technologies, Inc., Shenzhen (CN)

( * ) Notice: Subject to any disclaimer, the term of this patent is extended or adjusted under 35 U.S.C. 154(b) by 136 days.

(21) Appl. No.: 13/810,439

(22) PCT Filed: Aug. 11, 2010

(86) PCT No.: PCT/CN2010/075881
§ 371 (c)(1),
(2), (4) Date: Jan. 30, 2013

(87) PCT Pub. No.: WO2012/006794
PCT Pub. Date: Jan. 19, 2012

(65) Prior Publication Data
US 2013/0143493 A1 Jun. 6, 2013

(30) Foreign Application Priority Data
Jul. 16, 2010 (CN) .......................... 2010 1 0228684

(51) Int. Cl.
*H04B 5/00* (2006.01)
*H04B 7/00* (2006.01)

(52) U.S. Cl.
CPC .................................... *H04B 5/0075* (2013.01)
USPC ......................................... 455/41.1; 455/41.2

(58) Field of Classification Search
USPC ......................................... 455/41.1; 375/235
See application file for complete search history.

(56) References Cited

U.S. PATENT DOCUMENTS

2004/0161030 A1* 8/2004 Mohindra et al. ............ 375/235
2011/0226853 A1* 9/2011 Soh et al. ...................... 235/380

FOREIGN PATENT DOCUMENTS

CN 1996349 A 7/2007
CN 101013904 A 8/2007
CN 101414395 A 4/2009
CN 101739583 A 6/2010

OTHER PUBLICATIONS

International Search Report dated (mailed) Apr. 21, 2011; issued in related Application No. PCT/CN2010/075881 for Nationz Technologies Inc., et al. (3 pgs.).

* cited by examiner

*Primary Examiner* — Wesley Kim
*Assistant Examiner* — Raj Chakraborty
(74) *Attorney, Agent, or Firm* — Finnegan, Henderson, Farabow, Garrett & Dunner LLP

(57) ABSTRACT

An apparatus for low-frequency signal detection and transmission in a short-distance communication field comprises: a PCB, a magnetic induction module for inducing low-frequency magnetic signal, and a low-frequency signal processing module for detecting low-frequency signal, the magnetic induction module and the low-frequency signal processing module being integrated onto the PCB. The magnetic induction module is connected with the low-frequency signal processing module. The PCB can be a SIM card PCB, a Micro-SIM card PCB, a TF card PCB, a SD card PCB, or a UIM card PCB, etc. This invention realizes low-frequency signal detection and transmission function of a SIM card, a TF card, a SD card, a UIM card, or any of other various memory cards mounted in a mobile phone.

10 Claims, 10 Drawing Sheets

APPARATUS FOR LOW-FREQUENCY SIGNAL DETECTION AND TRANSMISSION

TECHNICAL FIELD

This invention relates to the communication field, especially to an apparatus for low-frequency signal detection and transmission.

TECHNICAL BACKGROUND

Now methods for realizing short-distance communications of a mobile phone have emerged, by adding radio-frequency functions to the SIM (Subscriber Identity Module) card of the mobile phone (called radio-frequency SIM card), adding radio-frequency function to the TF (T-Flash, also called MicroSD) card of the mobile phone (called radio-frequency TF card), or adding short-distance communication modules to the main board of the mobile phone. The emergence of such methods makes a mobile phone a super smart terminal that can recharge, consume, transact, and authenticate an identity, greatly meeting the urgent demand of the market.

Among those, the mobile phone short-distance solution based on radio-frequency SIM/TF is given extensive attention for its advantages such as simplicity and no need to change existing mobile phones. In this solution, technologies such as UHF (Ultra High Frequency) are adopted in the radio-frequency SIM/TF so that the radio-frequency signal can still be transmitted from a mobile phone when the radio-frequency SIM/TF card is inserted in the mobile phone. In this way, the existing mobile phone can possess short-distance communication functions, without changing any structure of the mobile phone. The transmission effects of radio-frequency signal of different mobile phones, however, vary greatly due to the differences between mobile phones' internal structures. For a mobile phone with strong transmission, the radio-frequency communication distance of the radio-frequency SIM/TF card can reach a few meters. Even for a mobile phone with weak transmission, the communication distance of the radio-frequency SIM/TF card can also reach dozens of centimeters. In mobile payment applications, such as card swiping in a public transit subway, usually there are strict requirements for a transaction distance to ensure the safety of the transaction. For example, the transaction distance is limited below 10 centimeters to avoid any loss due to mistaken card swiping when the user does not know. On the other hand, it is also required to ensure the communication reliability by limiting the transaction distance within a specified distance, to improve the transaction efficiency. Therefore, for radio-frequency SIM/TF based mobile phones, while short-distance communication functions are added to them, the ranges of their transaction distances must be effectively controlled.

Therefore, a system and method combining short-distance communication with low-frequency alternating magnetic field and RF high-frequency communication are provided to resolve the above problems. This system uses a low-frequency alternating magnetic field to realize distance detection and control, and to realize one-way communication between a card reader and a SIM/TF card. The system also uses a RF channel combining with low-frequency communication to realize a reliable binding with a terminal. Meanwhile, it uses a RF channel to realize high-speed data communication between the card reader and the card. In this solution, however, how to realize the low-frequency signal detection and the transmission system in the SIM/TF card influences the accuracy of the distance detection and control. Therefore, how to realize low-frequency signal detection and a transmission system in a SIM/TF card, especially how to realize a magnetic induction module in a SIM/TF card, is one of the problems to be resolved currently.

SUMMARY OF THE INVENTION

The technical problem to be resolved by this invention is to provide with an apparatus for low-frequency signal detection and transmission, to realize low-frequency signal detection and transmission.

The technical scheme of this invention to resolve the above technical problem is as follows: An apparatus for low-frequency signal detection and transmission is used in the short-distance communication field. The apparatus comprises a PCB (Printed Circuit Board) and a magnetic induction module for inducing low-frequency magnetic signal and a low-frequency signal processing module for a detecting low-frequency signal. The magnetic induction module and low-frequency signal processing module are integrated onto the PCB. Also, the magnetic induction module is connected with the low-frequency signal processing module.

The beneficial effects of this invention include: Integrated onto the PCB and interconnected with each other, the magnetic induction module for inducing low-frequency magnetic field and the low-frequency signal processing module for detecting low-frequency signal can realize low-frequency signal detection and transmission. Moreover, through the integration into the PCB, miniaturization of the apparatus and short-distance communication of mobile phones can be realized.

Based on the above technical scheme, this invention can also be improved to include the following features:

In one embodiment, the magnetic induction module is a magnetic induction coil with two output ends connected directly with the two input ends of the low-frequency signal processing module.

In another embodiment, the magnetic induction coil surrounds the low-frequency signal processing module and is close to the edge of the PCB.

The beneficial effects of the above embodiments include: They can fully utilize the region between the low-frequency signal processing module and the edge of PCB, increase the effective area of the magnetic induction coil, facilitate signal reception, and strengthen the anti-interference ability.

In further embodiments, the magnetic induction coil and low-frequency signal processing module are integrated into a same integrated-circuit ("IC"), and the magnetic induction coil surrounds the low-frequency signal processing module in a winding manner.

The beneficial effects of the above further embodiments include: Integrating the magnetic induction coil and the low-frequency signal processing module on a same IC can save the space occupation of the magnetic induction coil and low-frequency signal processing module. Surrounding of the magnetic induction coil around the low-frequency signal processing module in a winding manner can improve the effective area of the magnetic induction coil and improve the signal receiving ability.

By integrating the magnetic induction coil, as magnetic induction module, onto a PCB, the magnetic induction coil and the low-frequency signal processing module are integrated onto the same PCB. The magnetic induction coil also surrounds between the edge of the PCB and the low-frequency signal processing module or surrounds the low-frequency signal processing module in a winding manner, ensuring that it can induce the low-frequency magnetic field signal while saving space occupation.

In another embodiment, the low-frequency signal processing module comprises at least one low-pass filter module, at least one amplifier, at least one digital/analog converter, and at least one comparator. The magnetic induction module, low-pass filter module, and amplifier are sequentially connected. The output end of the amplifier is connected with the non-inverting input end of the comparator, and the output end of the digital/analog converter is connected with the inverting input end of the comparator.

In a yet further embodiment, the low-frequency signal processing module comprises a low-pass filter module, an amplifier, two digital/analog converters, and two comparators. The magnetic induction module, low-pass filter module, and amplifier are sequentially connected. The output end of the amplifier is connected with the non-inverting input ends of the two comparators, respectively. The two digital/analog converters and the two comparators form two routes. In each route, the output end of a digital/analog converter is connected with the inverting input end of a comparator. Each upper route and lower route forms one pair, totally one pair.

In yet another embodiment, the low-frequency signal processing module comprises a low-pass filter module, an amplifier, six digital/analog converters, and six comparators. The magnetic induction module, low-pass filter module, and amplifier are sequentially connected. The output end of the amplifier is connected with the non-inverting input ends of the six comparators, respectively. The six digital/analog converters and the six comparators form six routes. In each route, the output end of the digital/analog converter is connected with the inverting input end of the comparator. Each upper route and lower route forms one pair, totally three pairs.

In a further embodiment, the low-frequency signal processing module comprises at least one amplifier for amplifying the low-frequency induction signal, at least one analog/digital converter connected with the output end of the amplifier, and the digital processing module that is connected with the analog/digital converter and is used to determine the intensity of the original signal and to accomplish signal detection and transmission.

In yet another embodiment, the amplifier is an amplifier with dual-ended input and single-ended output or an amplifier with differential input and differential output.

In some embodiments, the PCB is a SIM card PCB, a Micro-SIM card PCB, a TF card PCB, a SD card PCB, or a UIM card PCB.

The beneficial effects of the above further embodiments include: The adoption of a SIM card, Micro-SIM card PCB, TF card, SD card, or UIM card as body of the apparatus for low-frequency signal detection and transmission makes it possible to integrate the apparatus for low-frequency signal detection and transmission of this invention into a mobile phone, thereby realizing the low-frequency signal detection and transmission of the mobile phone and further realizing the short-distance communication function of the mobile phone.

DESCRIPTION OF THE EMBODIMENTS

The principle and features of this invention are described in combination with the attached drawings as follows. The examples are given only for illustrating this invention instead of limiting the scope of this invention.

The main concept of this invention is to realize low-frequency signal detection and transmission via cards, especially SIM cards/Micro-SIM cards, TF cards, etc. That is to specifically apply the teachings from three Chinese patent applications previously filed by this applicant—Application No. 201010166186.X (an analog front end apparatus for low-frequency signal detection and transmission system), Application No. 201010166191.0 (a differential analog front end apparatus for low-frequency signal detection and transmission system), and Application No. 201010166432.1 (a method and apparatus for low-frequency magnetic field signal detection and transmission and distance determination)—to memory cards, such as SIM cards/Micro-SIM cards or TF cards, in order to reduce the cost on the basis of improving the accuracy of the low-frequency alternating magnetic field distance detection and control through a rationalized application. For the specific internal structure and realization mode, please make reference to the above cited three patent applications.

Embodiment 1

Figure 1:
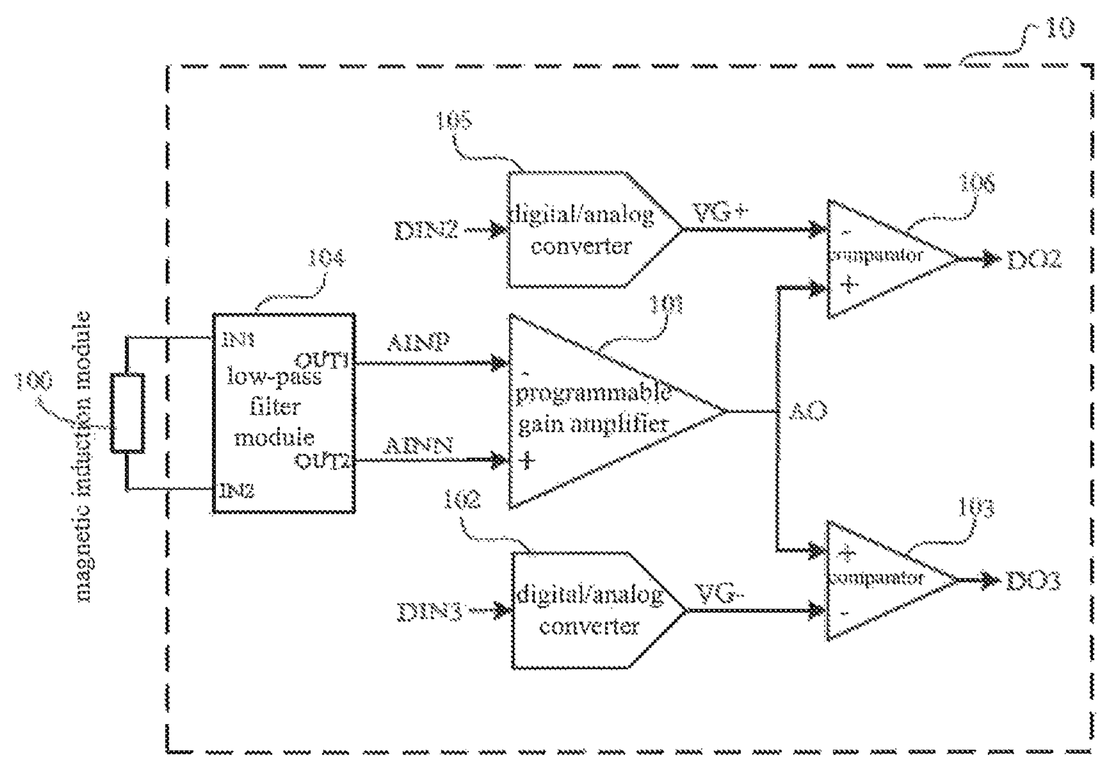
FIG. 1 is an exemplary structural diagram illustrating a magnetic induction module and a low-frequency signal processing module in Embodiment 1 of this invention.

FIG. 1 is an exemplary structural diagram illustrating a magnetic induction module and a low-frequency signal processing module in Embodiment 1 of this invention. It includes a magnetic induction module 100 and a low-frequency signal processing module 10. The low-frequency signal processing module 10 includes a low-pass filter module 104, an amplifier 101, a digital/analog converter 102, a digital/analog converter 105, comparator 103, and comparator 106. The magnetic induction module 100, low-pass filter module 104, and amplifier 101 are sequentially connected. The output end of amplifier 101 is connected with the non-inverting input ends of comparator 103 and comparator 106, respectively. The digital/analog converter 102, digital/analog converter 105, comparator 103, and comparator 106 form two routes. In each route, the output end of a digital/analog converter is connected with the inverting input end of a comparator. Each upper route and lower route forms one pair, totally one pair. Among them, amplifier 101 can be an amplifier with dual-ended input and single-ended output, or a differential amplifier. And low-frequency signal processing module 10 can be made as one IC (integrated circuit).

Figure 2:
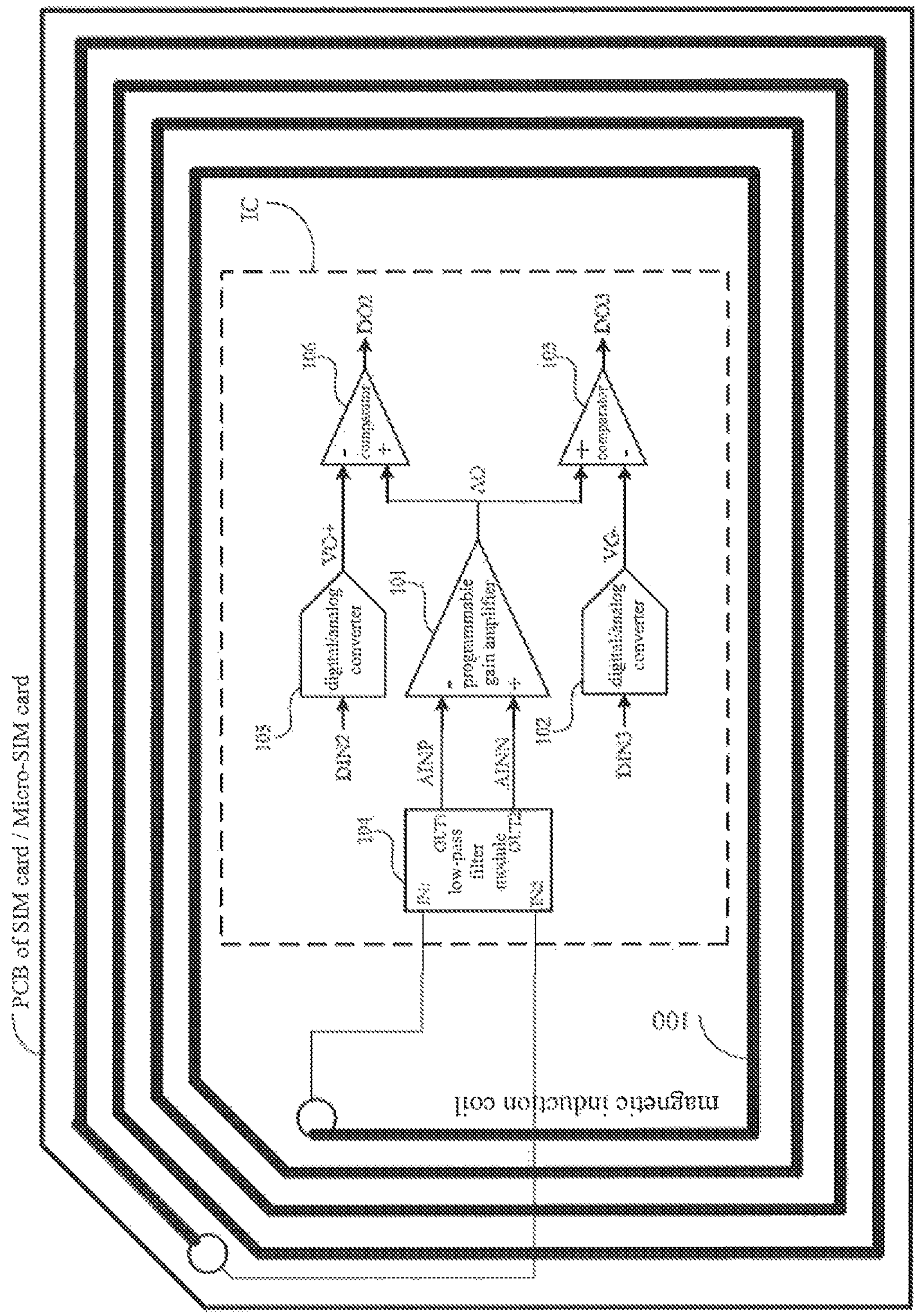
FIG. 2 is an exemplary specific implementation of a structural diagram illustrating a magnetic induction module and a low-frequency signal processing module in Embodiment 1 of this invention, which are applied to a SIM card/a Micro-SIM card.

FIG. 2 is an exemplary specific implementation of a structural diagram illustrating a magnetic induction module and a low-frequency signal processing module in Embodiment 1 of this invention, which are applied to a SIM card/Micro-SIM card. As shown in FIG. 2, in this exemplary specific implementation of the structure, an apparatus for low-frequency signal detection and transmission is realized in the PCB of a SIM card/Micro-SIM card. The low-frequency signal processing module 10 is made as an independent IC, and is made on the PCB of a SIM card/Micro-SIM card along with a magnetic induction coil as magnetic induction module 100 (in short, "coil PCB realization mode"). The apparatus includes a magnetic induction coil and an IC of low-frequency signal processing module 10. The magnetic induction coil surrounds between the edge of the PCB of the SIM card/Micro-SIM card and the low-frequency signal processing module 10. The two output ends of the magnetic induction coil are connected directly with the input ends of low-pass filter module 104 in the IC of low-frequency signal processing module 10. The IC of low-frequency signal processing module 10 internally includes a low-pass filter module 104, an amplifier 101, a digital/analog converter 102, a digital/analog converter 105, a comparator 103, and a comparator 106. The low-pass filter module 104 and amplifier 101 are connected sequentially. The output end of amplifier 101 is connected with the non-inverting input ends of comparator 103 and comparator 106, respectively. The digital/analog converter 102, digital/analog converter 105, comparator 103, and comparator 106 form two routes. In each route, the output end of a digital/analog converter is connected with the inverting input end of a comparator. Each upper route and lower route forms one pair, totally one pair. Among them, amplifier 101 can be an amplifier with dual-ended input and single-ended output, or a differential amplifier. Because the area of a SIM card is bigger than that of a TF card, realizing the apparatus in a SIM card is preferable. For a Micro-SIM card, though its area is smaller than that of a SIM card, this implementation can also be selected.

Figure 3:
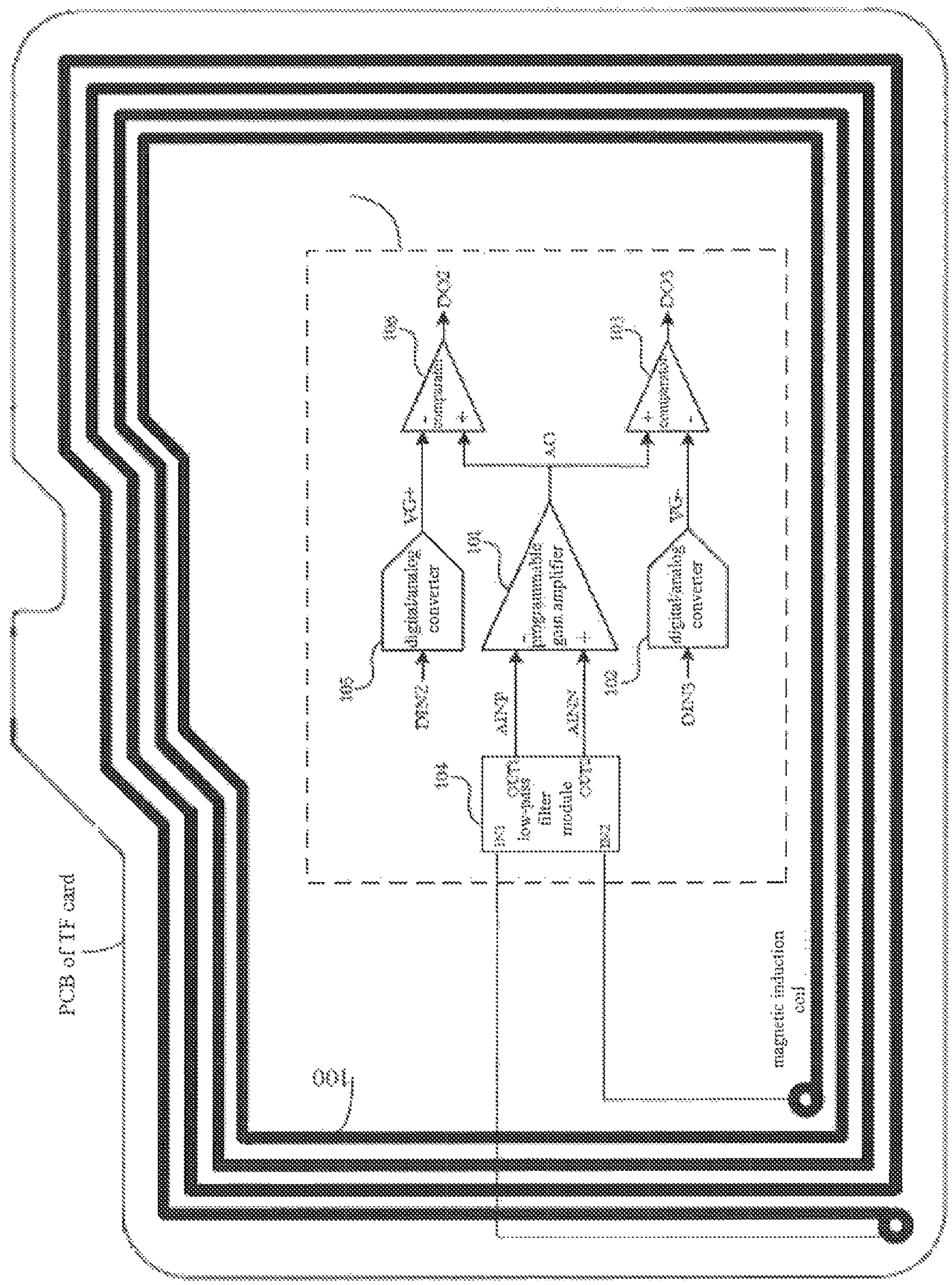
FIG. 3 is an exemplary specific implementation of a structural diagram illustrating a magnetic induction module and a low-frequency signal processing module in Embodiment 1 of this invention, which are applied to a TF card.

FIG. 3 is an exemplary specific implementation of a structural diagram illustrating a magnetic induction module and a low-frequency signal processing module in Embodiment 1 of this invention, which are applied to a TF card. As shown in FIG. 3, in this exemplary specific implementation of the structure, the apparatus for low-frequency signal detection and transmission is realized in the PCB of a TF card. The low-frequency signal processing module 10 is made as an independent IC, and is made on the PCB of a TF card along with the magnetic induction coil as magnetic induction module 100 (in short, "coil PCB realization mode"). The apparatus includes a magnetic induction coil and an IC of a low-frequency signal processing module 10. The magnetic induction coil surrounds between the edge of the PCB of the TF card and the low-frequency signal processing module 10. The two output ends of the magnetic induction coil are connected directly with the input ends of low-pass filter module 104 in the IC of low-frequency signal processing module 10. The internal structure and connection mode of the IC of low-frequency signal processing module 10 are the same as those of the IC in FIG. 2. It includes a low-pass filter module 104, an amplifier 101, a digital/analog converter 102, a digital/analog converter 105, comparator 103, and comparator 106. The low-pass filter module 104 and amplifier 101 are connected sequentially. The output end of amplifier 101 is connected with the non-inverting input ends of comparator 103 and comparator 106, respectively. The digital/analog converter 102, digital/analog converter 105, comparator 103, and comparator 106 form two routes. In each route, the output end of the digital/analog converter is connected with the inverting input end of the comparator. Each upper route and lower route forms one pair, totally one pair. Among them, amplifier 101 can be an amplifier with dual-ended input and single-ended output or a differential amplifier.

Figure 4:
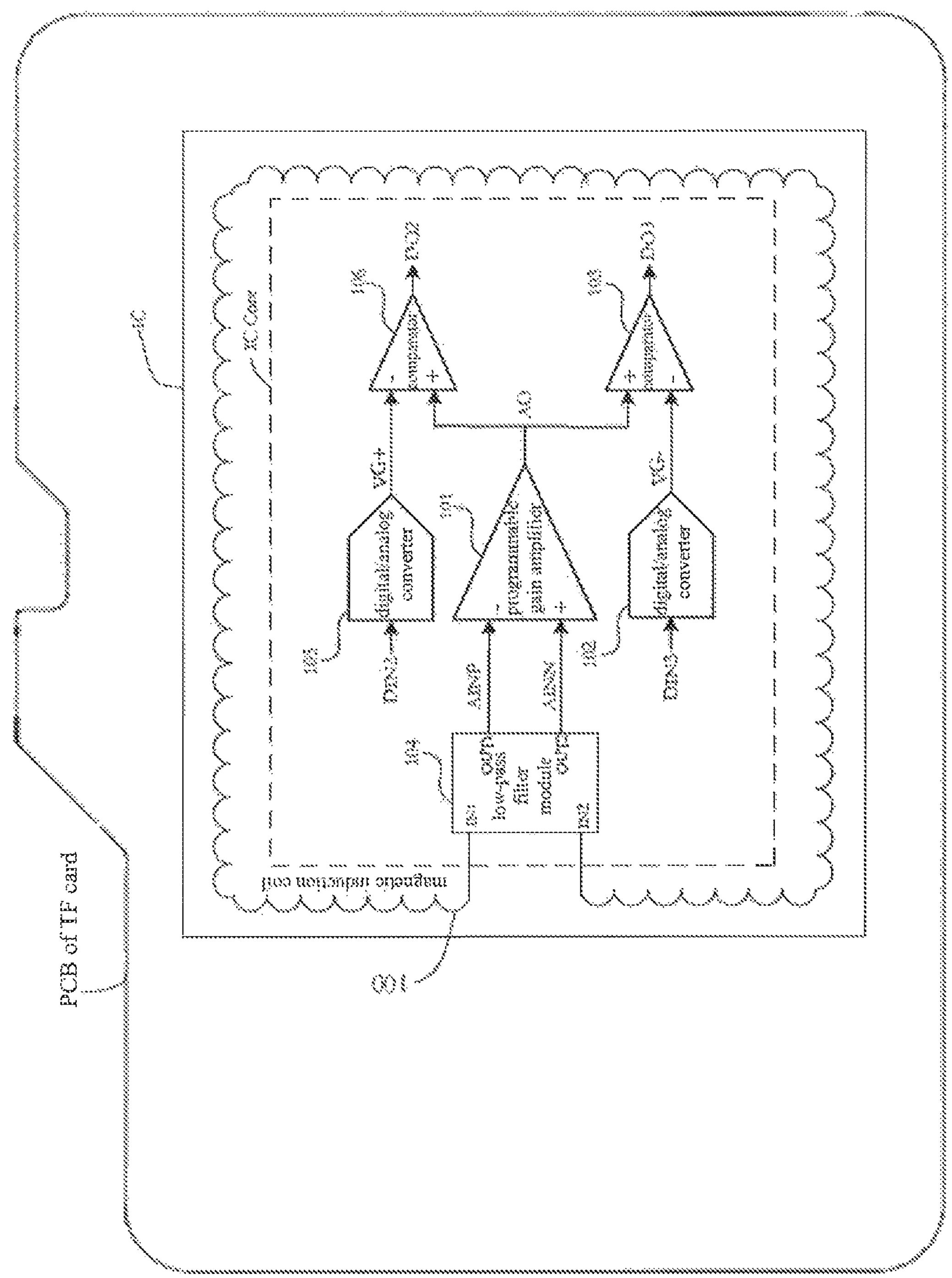
FIG. 4 is another exemplary specific implementation of a structural diagram illustrating a magnetic induction module and a low-frequency signal processing module in Embodiment 1 of this invention, which are applied at a TF card.

FIG. 4 is another exemplary specific implementation of a structural diagram illustrating a magnetic induction module and a low-frequency signal processing module in Embodiment 1 of this invention, which are applied to a TF card. As shown in FIG. 4, in this exemplary specific implementation of the structure, the apparatus for low-frequency signal detection and transmission is made as an IC in the PCB of a TF card. The low-frequency signal processing module 10, as the core circuit of the IC, is made in a same IC as the magnetic induction coil as magnetic induction module 100 (in short, coil IC realization mode). Moreover, the magnetic induction coil surrounds the low-frequency signal processing module 10 in a winding manner. The circuit structure of low-frequency signal processing module 10 and its connection mode with the magnetic induction coil are the same as those in FIGS. 2 and 3, and will not be repeated here. The advantage of this implementation is using a small area. Because the area of a TF card is smaller than that of a SIM card, realizing the apparatus in a TF card is preferred.

Figure 5:
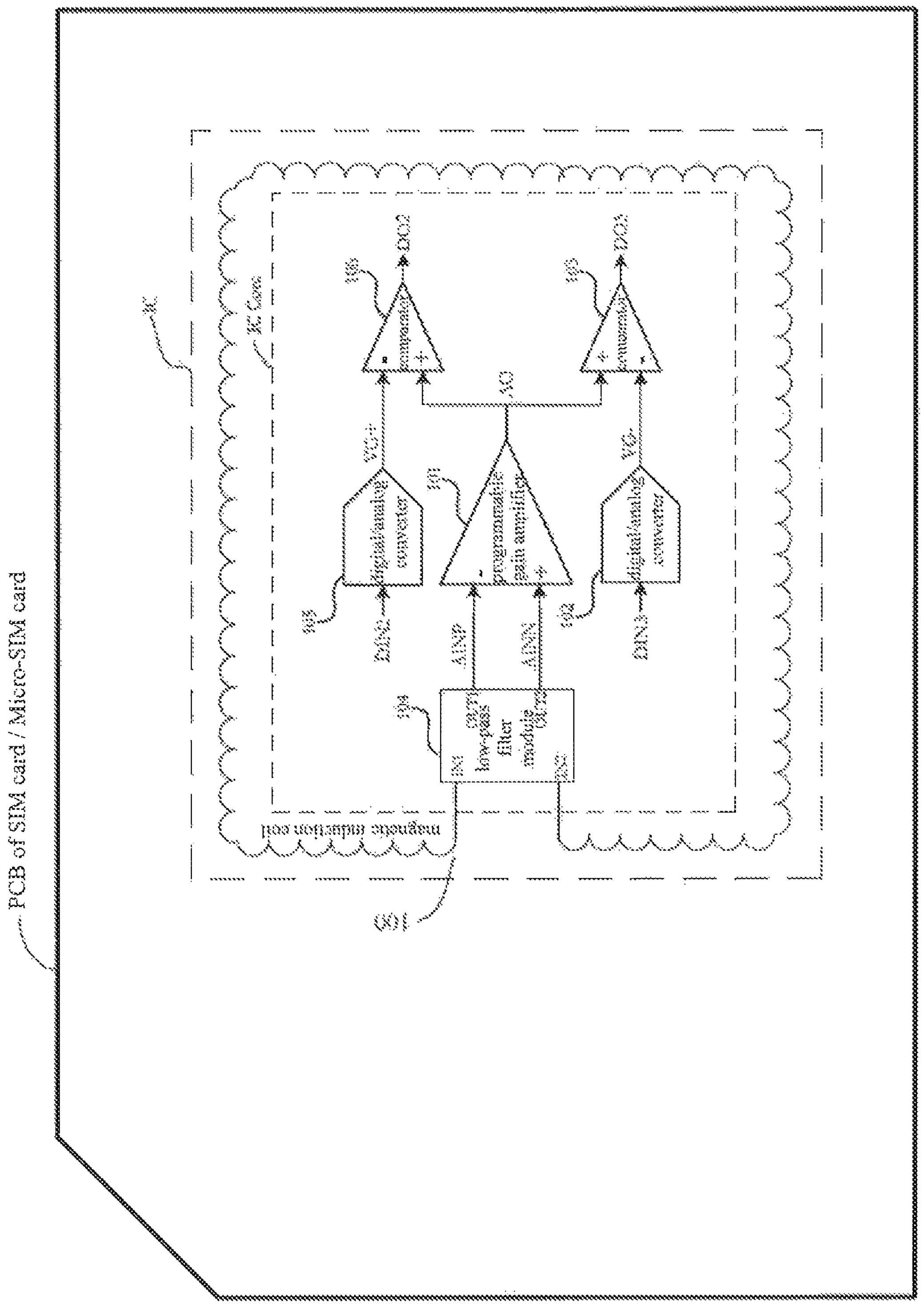
FIG. 5 is yet another exemplary specific implementation of a structural diagram illustrating a magnetic induction module and a low-frequency signal processing module in Embodiment 1 of this invention, which are applied to a SIM card/Micro-SIM card.

FIG. 5 is yet another exemplary specific implementation of a structural diagram illustrating a magnetic induction module and a low-frequency signal processing module in Embodiment 1 of this invention, which are applied to a SIM card/Micro-SIM card. As shown in FIG. 5, in this exemplary specific implementation of the structure, the apparatus for low-frequency signal detection and transmission is made as an IC in the PCB of a SIM card/Micro-SIM card. The low-frequency signal processing module 10, as the core circuit of the IC, is made in a same IC as the magnetic induction coil as magnetic induction module 100 (in short, coil IC realization mode). Moreover, the magnetic induction coil surrounds the low-frequency signal processing module 10 in a winding manner. The circuit structure of low-frequency signal processing module 10 and its connection mode with the magnetic induction coil are the same as those shown in FIGS. 2, 3 and 4, and will not be repeated here. The advantage of this implementation is using a small area. Because the area of a Micro-SIM card is smaller than that of a SIM card, realizing the apparatus in Micro-SIM card is preferred.

Embodiment 2

Figure 6:
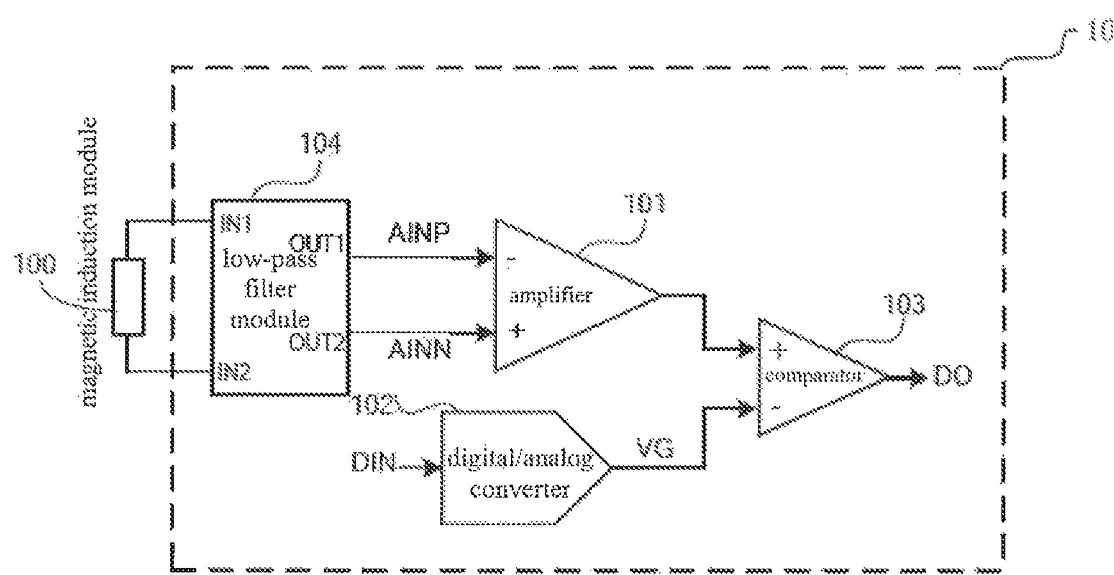
FIG. 6 is an exemplary structural diagram illustrating a magnetic induction module and a low-frequency signal processing module in Embodiment 2 of this invention.

FIG. 6 is an exemplary structural diagram illustrating a magnetic induction module and a low-frequency signal processing module in Embodiment 2 of this invention. It includes a magnetic induction module 100 and a low-frequency signal processing module 10. The low-frequency signal processing module 10 includes a low-pass filter module 104, an amplifier 101, a digital/analog converter 102, and a comparator 103. The magnetic induction module 100, low-pass filter module 104, and amplifier 101 are connected sequentially. The output end of amplifier 101 is connected with the non-inverting input end of comparator 103. The output end of digital/analog converter 102 is connected with the inverting input end of comparator 103. Amplifier 101 can be a amplifier with dual-ended input and single-ended output or a differential amplifier. Amplifier 101 pre-amplifies the weak signal inputted, and digital/analog converter 102 converts a digital signal outputted from the digital controller into an analog signal. Then, comparator 103 is utilized to compare the two signals to acquire a needed digital signal. The digital signal is then transmitted to a digital controller for processing. The digital controller mentioned here belongs to the low-frequency detection and transmission system but not to the analog front end. Its functions are to control the on/off mode of the comparator and the digital/analog converter based on an output of the comparator. The low-frequency signal processing module 10 can be made as an IC (integrated circuit).

The structures of the magnetic induction module and low-frequency signal processing module of Embodiment 2 shown in FIG. 6, and the mode of their application to a SIM card/Micro-SIM card or TF card are the same as the coil PCB realization mode (FIGS. 2 and 3) and the coil IC realization mode (FIGS. 4 and 5), and will not be repeated here.

Embodiment 3

Figure 7:
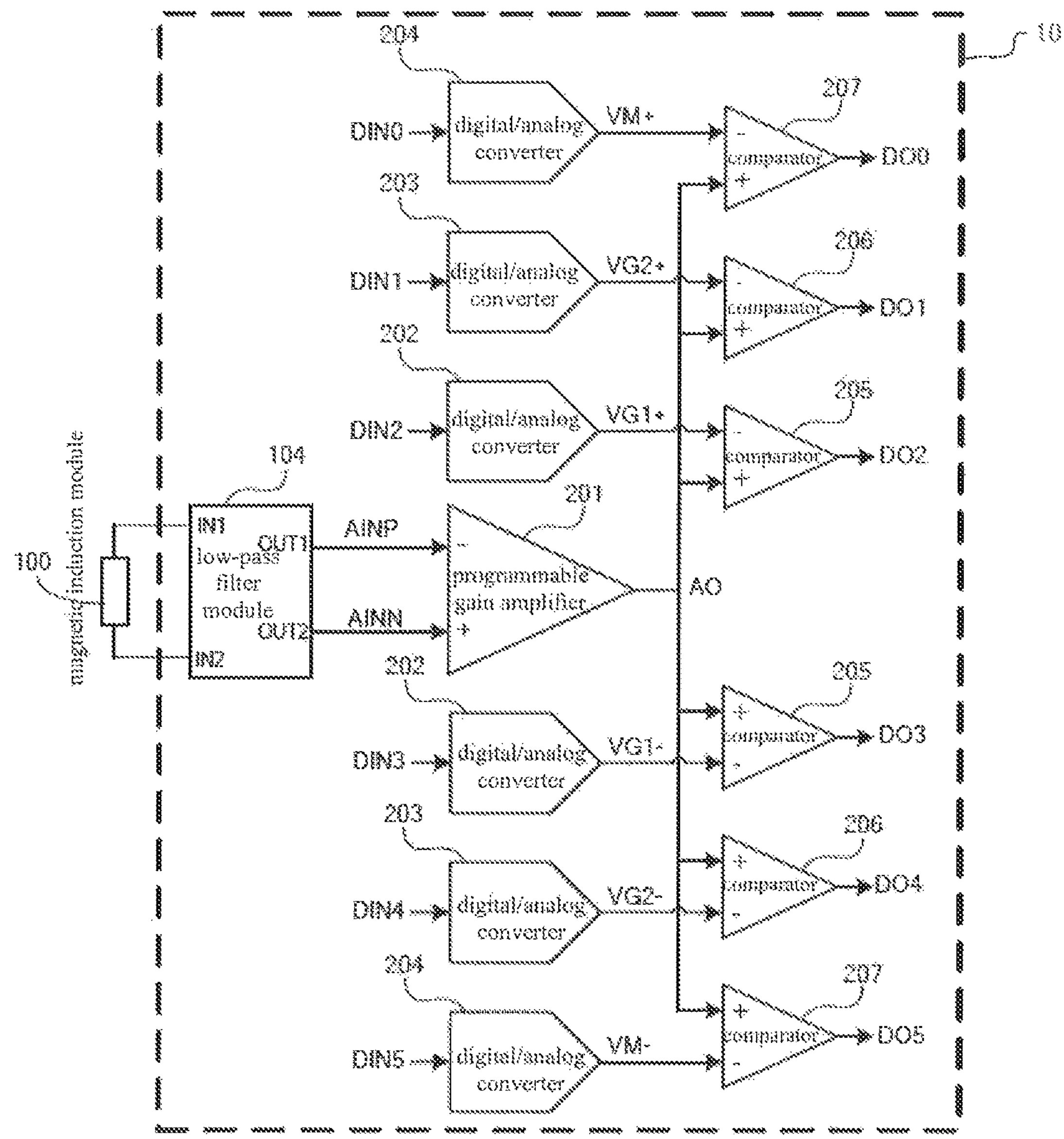
FIG. 7 is an exemplary structural diagram illustrating a magnetic induction module and a low-frequency signal processing module in Embodiment 3 of this invention.

FIG. 7 is an exemplary structural diagram illustrating a magnetic induction module and a low-frequency signal processing module in Embodiment 3 of this invention. It includes a magnetic induction module 100 and a low-frequency signal processing module 10. The low-frequency signal processing module 10 includes a low-pass filter module 104, an amplifier 201, six digital/analog converters 202, 203, and 204, and six comparators 205, 206, and 207. The output end of amplifier 201 is connected with the non-inverting input ends of the six comparators 205, 206, and 207. The six digital/analog converter 202, 203, and 204 and the six comparators 205, 206, and 207 form six routes. In each route, the output end of a digital/analog converter is connected with the inverting input end of a comparator. Each upper route and lower route forms one pair, totally three pairs. Among them, amplifier 101 can be an amplifier with dual-ended input and single-ended output or a differential amplifier. And low-frequency signal processing module 10 can be made as an IC (integrated circuit).

The structures of the magnetic induction module and low-frequency signal processing module of Embodiment 3 shown in FIG. 7, the mode of their application to a SIM card/Micro-SIM card or TF card is the same as the coil PCB realization mode (FIGS. 2 and 3) and the coil IC realization mode (FIGS. 4 and 5), and will not be repeated here.

Embodiment 4

Figure 8:
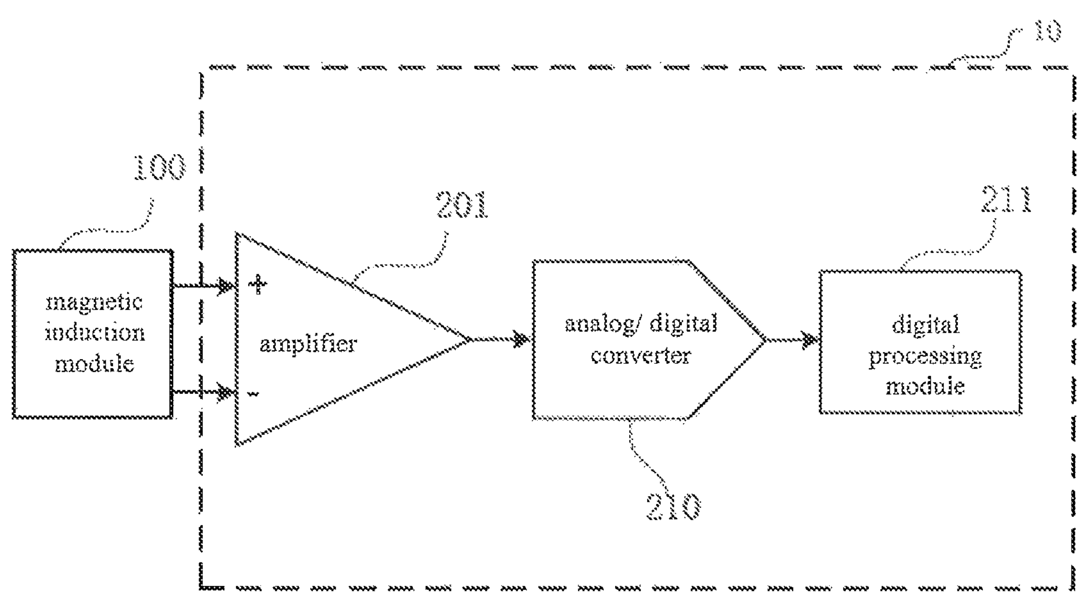
FIG. 8 is an exemplary structural diagram illustrating a magnetic induction module and a low-frequency signal processing module in Embodiment 4 of this invention.

FIG. 8 is an exemplary structural diagram illustrating a magnetic induction module and a low-frequency signal processing module in Embodiment 4 of this invention. It includes a magnetic induction module 100 and a low-frequency signal processing module 10. The low-frequency signal processing module 10 includes an amplifier 201 for amplifying a low-frequency induction signal, a analog/digital converter 210 connected with the output end of the amplifier, and a digital processing module 211 that is connected with analog/digital converter 210 and used for determining the intensity of the original signal and for accomplishing the signal detection and transmission. The apparatus of this embodiment collects and amplifies a weak low-frequency signal, through analog/digital conversion and digital algorithm, to finally accomplish distance control and transaction communication.

The structures of the magnetic induction module and low-frequency signal processing module of Embodiment 4 shown in FIG. 8 and their mode of application to a SIM card/Micro-SIM card or a TF card is the same as the coil PCB realization mode (FIGS. 2 and 3) and the coil IC realization mode (FIGS. 4 and 5), and will not be repeated here.

Figure 9:
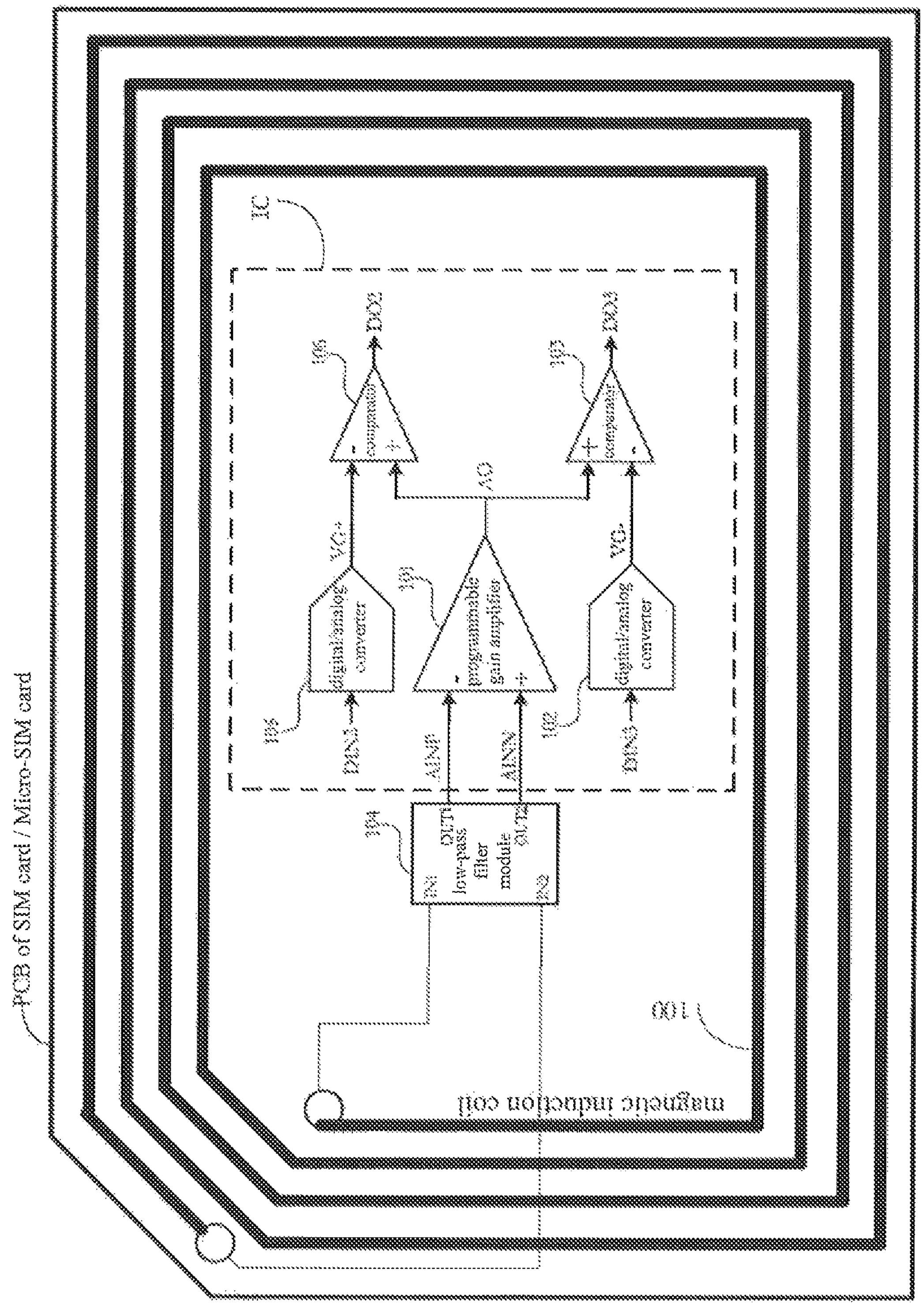
FIG. 9 is another exemplary specific implementation of a structural diagram illustrating a magnetic induction module and a low-frequency signal processing module in Embodiment 1 of this invention, which are applied to a SIM card/Micro-SIM card.

FIG. 9 is another exemplary specific implementation of a structural diagram of the magnetic induction module and a low-frequency signal processing module in Embodiment 1 of this invention, which are applied to a SIM card/Micro-SIM card. As shown in FIG. 9, in this exemplary specific implementation of the structure, an apparatus for low-frequency signal detection and transmission is realized in the PCB of a SIM card. The circuit part of low-frequency signal processing module 10 except for low-pass filter module 104 is made as an independent IC, and is made on the PCB of a SIM card along with low-pass filter module 104 and the magnetic induction coil as magnetic induction module 100. The apparatus includes a magnetic induction coil, a low-pass filter module 104, and an IC. The magnetic induction coil surrounds between the edge of the PCB of the SIM card/Micro-SIM card and the low-frequency signal processing module 10. The two output ends of the magnetic induction coil are connected directly with the input end of low-pass filter module 104. The low-pass filter module 104 is connected with the input end of the amplifier 101 in the IC. The IC internally includes an amplifier 101, a digital/analog converter 102, a digital/analog converter 105, a comparator 103, and a comparator 106. The low-pass filter module 104 and amplifier 101 are connected sequentially. The output end of amplifier 101 is connected with the non-inverting input ends of comparator 103 and comparator 106, respectively. The digital/analog converter 102, digital/analog converter 105, comparator 103, and comparator 106 form two routes. In each route, the output end of a digital/analog converter is connected with the inverting input end of a comparator. Each upper route and lower route forms one pair, totally one pair. Among them, amplifier 101 can be an amplifier with dual-ended input and single-ended output or a differential amplifier. The interior of the IC can also be the part of the low-frequency signal processing module 10 other than the low-pass filter module 104 as shown in FIG. 6 of Embodiment 2 or FIG. 7 of Embodiment 3.

Figure 10:
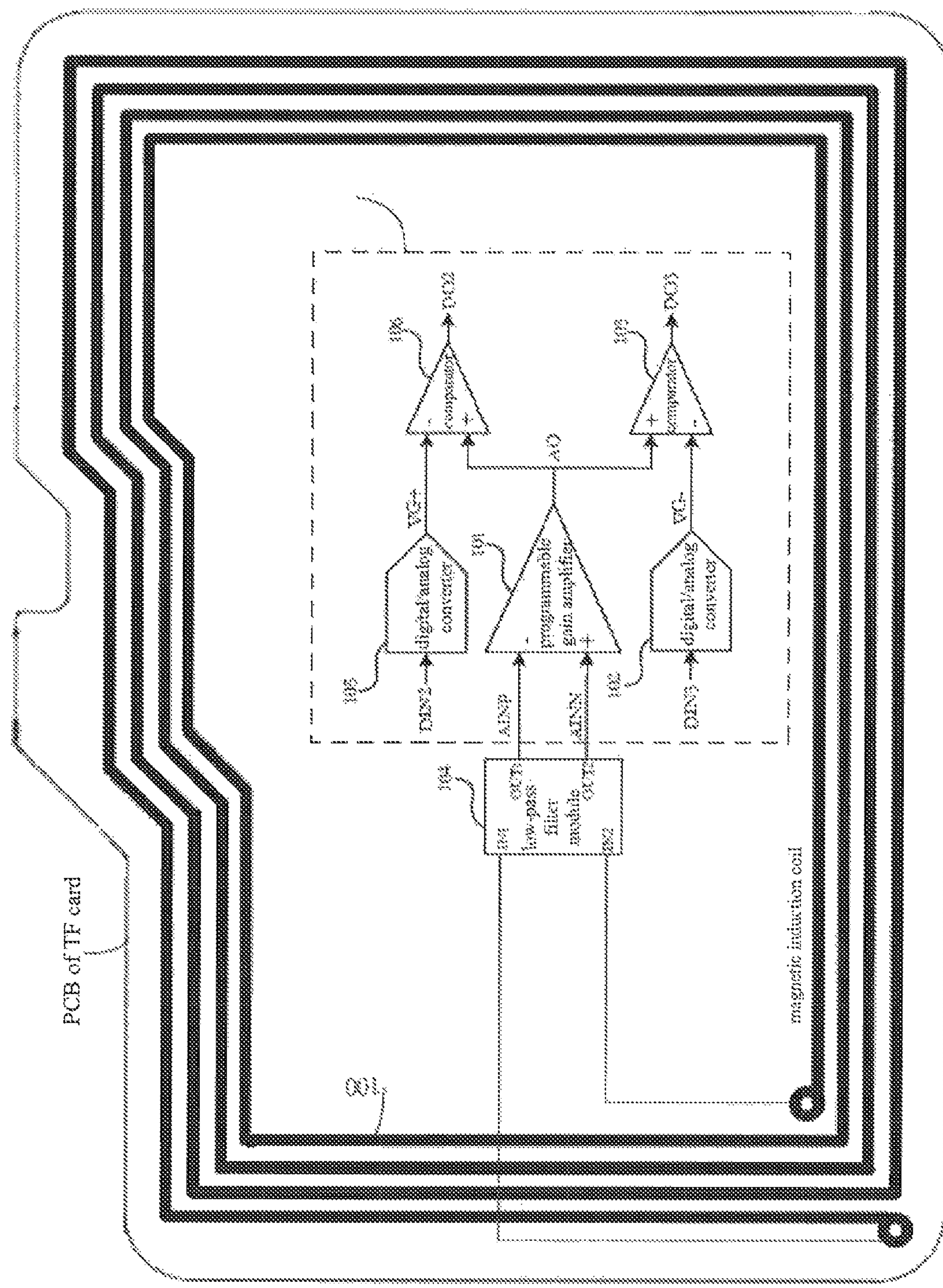
FIG. 10 is yet another exemplary specific implementation of a structural diagram illustrating a magnetic induction module and a low-frequency signal processing module in Embodiment 1 of this invention, which are applied to a TF card.

FIG. 10 is yet another exemplary specific implementation of a structural diagram of a magnetic induction module and a low-frequency signal processing module in Embodiment 1 of this invention, which are applied to a TF card. As shown in FIG. 10, in this exemplary specific implementation of the structure, an apparatus for low-frequency signal detection and transmission is realized in the PCB of a TF card. The circuit part of low-frequency signal processing module 10 except for low-pass filter module 104 is made as an independent IC, and is made on the PCB of the TF card along with low-pass filter module 104 and the magnetic induction coil as magnetic induction module 100. The apparatus includes a magnetic induction coil, a low-pass filter module 104, and an IC. The magnetic induction coil surrounds between the edge of the PCB of the TF card and the low-frequency signal processing module 10. The two output ends of the magnetic induction coil are connected directly with the input ends of low-pass filter module 104. The low-pass filter module 104 is connected with the input end of the amplifier 101 in the IC. The IC internally includes an amplifier 101, a digital/analog converter 102, a digital/analog converter 105, a comparator 103, and a comparator 106. The low-pass filter module 104 and amplifier 101 are connected sequentially. The output end of amplifier 101 is connected with the non-inverting input ends of comparator 103 and comparator 106, respectively. The digital/analog converter 102, digital/analog converter 105, comparator 103, and comparator 106 form two routes. In each route, the output end of a digital/analog converter is connected with the inverting input end of a comparator. Each upper route and lower route forms one pair, totally one pair. Among them, amplifier 101 can be an amplifier with dual-ended input and single-ended output or a differential amplifier. The interior of the IC can also be the part of the low-frequency signal processing module 10 except the low-pass filter module 104 as shown in FIG. 6 of Embodiment 2 or FIG. 7 of Embodiment 3.

All of the amplifiers described above can be amplifiers each with dual-ended input and single-ended output or amplifiers each with differential-input and differential-output.

The SIM cards described above include not only currently most common SIM cards each with a length of 25 mm and a width of 15 mm but also SIM cards of other sizes. The Micro-SIM cards described above include not only Micro-SIM cards each with a length of 15 mm and a width of 12 mm but also Micro-SIM cards of other sizes. In addition to the implementations in SIM cards, Micro-SIM cards, and TF cards, the coil IC realization mode and coil PCB realization mode as described above can also be implemented in SD cards, UIM cards, and other memory cards that can be placed in mobile phones.

The above descriptions are just some exemplary embodiments of this invention and are not intended to limit this invention. Any modification, equivalent substitutions, and improvements made under the spirit and principle of this invention shall all be included in the protection scope of this invention.

What is claimed is:

1. An apparatus for low-frequency signal detection and transmission, applied in a short-distance communication field, comprises:

a Printed Circuit Board ("PCB"); and a magnetic induction module for inducing a low-frequency magnetic signal and a low-frequency signal processing module for detecting a low-frequency signal, the magnetic induction module and the low-frequency signal processing module being integrated onto the PCB;

wherein the magnetic induction module is connected with the low-frequency signal processing module;

wherein the low-frequency signal processing module comprises:

at least one low-pass filter module, at least one amplifier, at least one digital/analog converter, and at least one comparator; and wherein the magnetic induction module, the at least one low-pass filter module, and the at least one amplifier are connected sequentially such that an output end of the at least one amplifier is connected with a non-inverting input end of the at least one comparator, and an output end of the at least one digital/analog converter is connected with an inverting input end of the at least one comparator.

2. The apparatus of claim 1, wherein the magnetic induction module is a magnetic induction coil with two output ends connected directly with two input ends of the low-frequency signal processing module.

3. The apparatus of claim 2, wherein the magnetic induction coil surrounds the low-frequency signal processing module and is close to edges of the PCB.

4. The apparatus of claim 2, wherein the magnetic induction coil and the low-frequency signal processing module are integrated onto a same integrated circuit and the magnetic induction coil surrounds the low-frequency signal processing module in a winding manner.

5. An apparatus for low-frequency signal detection and transmission, applied in a short-distance communication field, the apparatus comprising:

a Printed Circuit Board ("PCB"); and a magnetic induction module for inducing a low-frequency magnetic signal and a low-frequency signal processing module for detecting a low-frequency signal, the magnetic induction module connected to the low-frequency signal processing module and both integrated onto the PCB;

wherein the low-frequency signal processing module comprises:

a low-pass filter module, an amplifier, two digital/analog converters, and two comparators; and, wherein the magnetic induction module, the low-pass filter module, and the amplifier are connected sequentially, with an output end of the amplifier connected with a non-inverting input end of each of the two comparators and for each pair of a digital/analog converter and a comparator, an output end of the digital/analog converter is connected with an inverting input end of the comparator.

6. An apparatus for low-frequency signal detection and transmission, applied in a short-distance communication field, the apparatus comprising:

a Printed Circuit Board ("PCB"); and a magnetic induction module for inducing a low-frequency magnetic signal and a low-frequency signal processing module for detecting a low-frequency signal, the magnetic induction module connected with the low-frequency signal processing module and being integrated onto the PCB;

wherein the low-frequency signal processing module comprises:

a low-pass filter module, an amplifier, six digital/analog converters, and six comparators; and wherein the magnetic induction module, the low-pass filter module, and the amplifier are connected sequentially, with an output end of the amplifier connected with a non-inverting input end of each of the six comparators, and for each respective pair of a digital/analog converter and a comparator, an output end of the digital/analog converter is connected with an inverting input end of the comparator.

7. The apparatus of claim 1, wherein each amplifier is an amplifier with dual-ended input and single-ended output or an amplifier with differential-input and differential-output.

8. The apparatus of claim 1, wherein the low-frequency signal processing module comprises:

at least one amplifier for amplifying a low-frequency induction signal;

at least one analog/digital converter connected with an output end of the amplifier; and a digital processing module connected with the at least one analog/digital converter and for determining an intensity of an original signal and accomplishing the low-frequency signal detection and transmission.

9. The apparatus of claim 8, wherein the at least one amplifier is with dual-ended input and single-end output or with differential-input and differential-output.

10. The apparatus of claim 1, wherein the PCB is a SIM card PCB, a Micro-SIM card PCB, a TF card PCB, a SD card PCB, or a UIM card PCB.

* * * * *